Jan. 23, 1962 S. M. NAMPA 3,017,842
BULKHEAD
Filed July 1, 1957 10 Sheets-Sheet 1

INVENTOR.
Sulo M. Nampa.
BY
Harness, Dickey & Pierce
ATTORNEYS

Jan. 23, 1962 S. M. NAMPA 3,017,842
BULKHEAD
Filed July 1, 1957 10 Sheets-Sheet 2

INVENTOR.
Suto M. Nampa.
BY
Harness, Dickey & Pierce.
ATTORNEYS

Jan. 23, 1962 S. M. NAMPA 3,017,842
BULKHEAD
Filed July 1, 1957 10 Sheets-Sheet 5

INVENTOR.
Sulo M. Nampa.
BY
Harness, Dickey & Pierce
ATTORNEYS

Jan. 23, 1962   S. M. NAMPA   3,017,842
BULKHEAD

Filed July 1, 1957   10 Sheets-Sheet 10

INVENTOR.
Suto M. Nampa.
BY
Harness, Dickey & Pierce.
ATTORNEYS.

3,017,842
BULKHEAD

Sulo Michael Nampa, Detroit, Mich., assignor to Evans Products Company, a corporation of Delaware
Filed July 1, 1957, Ser. No. 669,170
11 Claims. (Cl. 105—376)

This invention relates to movable walls and is particularly concerned with movable bulkheads that may be used to brace and compartmentize freight, either during stationary storage or during transportation in railroad cars, trucks, ships, or airplanes. Inasmuch as the major usage of bulkheads is in railroad boxcars at the present time, the invention is especially concerned with railroad freight bracing systems.

It is an object of this invention to overcome the inherent disadvantages of large size and weight of bulkheads by providing a bulkhead construction embodying automatic mechanical assistance to an operator who is raising or lowering it.

Another object of the invention is to provide a bulkhead having a bottom folding section that may be separated from the main section for repairs or replacement, which may be structurally different from the main section so that it can be constructed to sustain heavier loads, and which may be folded against the main section to raise the center of gravity of the total bulkhead. A further object is to provide means for automatically latching and holding the bottom section in folded position.

Another object of the invention is to provide latching structure for a bulkhead of such a nature that it may be used in conjunction with general freight bracing systems now available on the open market, thus permitting standard freight bracing components such as cross bars, deck boards, etc. to be used in a car utilizing bulkheads of this invention.

Another object of the invention is to provide an improved bulkhead construction from the standpoint of stowage in an inoperative position.

Another object of the invention is to improve the structure for supporting the bulkhead and moving it lengthwise of the car and for securing it in operative position in the car.

The invention is illustrated in the accompanying drawings in which:

FIG. 8 is a front view of the bottom section of the bulkhead;

Figure 1:
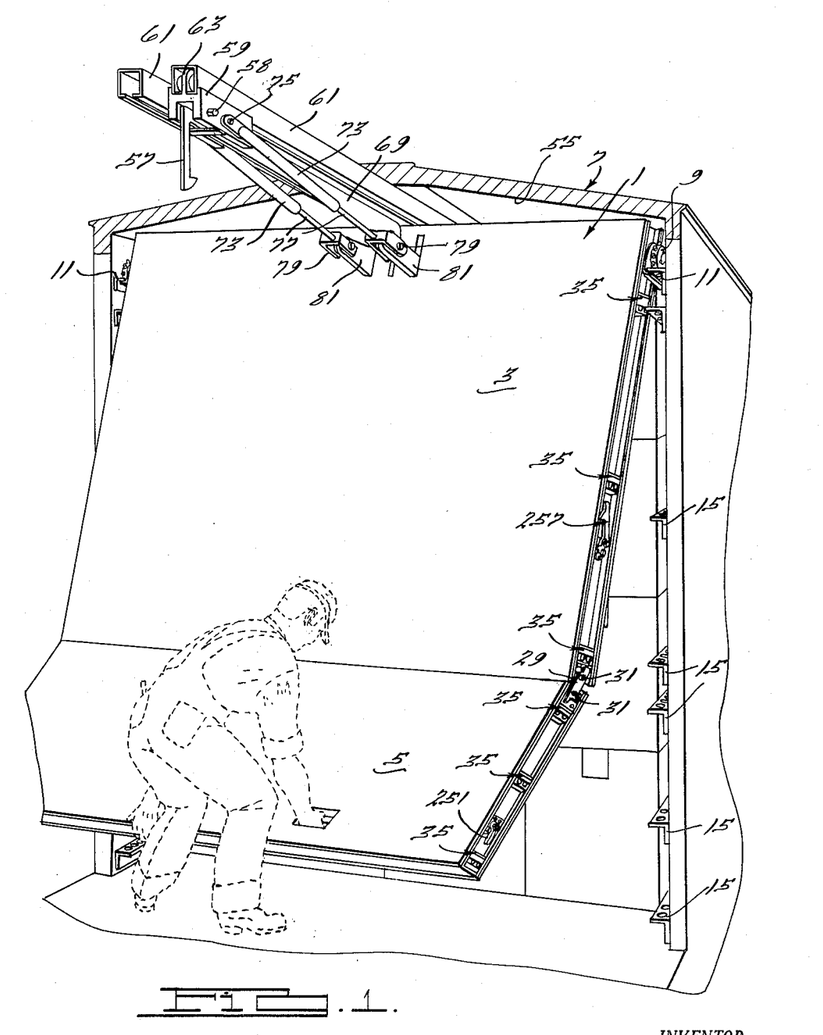
FIGURE 1 is a perspective front view of the improved bulkhead installed in a boxcar showing an operator lowering the bulkhead into operative, vertical position, the boxcar structure being broken away and simplified to facilitate illustration.
Figure 2:
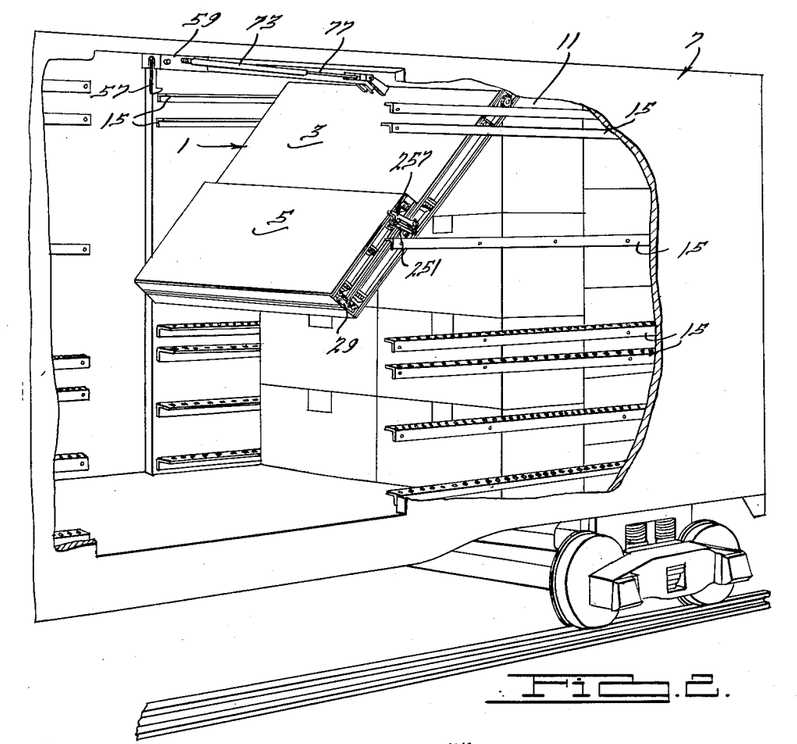
FIG. 2 is a perspective side view of the bulkhead in a broken away freight car, the bulkhead being in a position intermediate stowed and operative positions.

The bulkhead 1 comprises an upper section 3 and a lower section 5, the latter preferably being about one third of the height of the bulkhead. As can be seen in FIGS. 1 and 2, the bulkhead extends transversely across the width and height of a boxcar 7 (though it can be used elsewhere) and provides a movable wall that can be used to divide the car in separate compartments.

The weight of the bulkhead 1 is carried on sprocket wheels 9, at the top of the bulkhead, and transmitted by them into perforated, angle-shaped rails 11 that are welded to vertical posts 13 which form a part of the structural side wall framework of the boxcar. There are other rails 15, identical to rails 11, also welded to the posts 13 at different levels and these provide support members for freight bracing components as is well known to those in the industry, this type of system being sold by the assignee hereof under the trademark "DF" and being disclosed in U.S. Patent No. 2,725,826.

The sprocket wheels 9 have radially projecting pins 17 that are spaced apart by a distance which corresponds to the pitch of the perforations 19 in the rails and which will project into the holes 19 as the wheels roll on the rails. This prevents the wheel on one side of the bulkhead from getting ahead of the wheel on the other side and therefore prevents binding of the bulkhead during longitudinal movement.

The wheels 9 are mounted on the ends of axles which are rotatably and coaxially supported in the ends of a cylindrical tube 21 that forms a part of the framework of the bulkhead section 3. One of the axles 23 is telescopic in the tube 21 and will therefore permit easy rolling despite variations in the spacing between opposite rails 11. Welded to the ends of the tube 21, or to the sides of section 3, are retainer plates 25 each of which has a horizontal flange 27. This is disposed below the flange of the rail 11 on which wheel 9 rides and will engage the bottom of the flange to prevent the pins 17 from coming out of the holes.

In addition to translation along the length of rails 11, it will be seen that the bulkhead 1 can be pivoted up or down about the axis of tube 21, the tube rotating on the axles of sprocket wheels 9.

In order to install the bulkhead 1 in the boxcar, which means mounting it on rails 11, removable sections (not shown) of rails 11 will be taken out to permit the wheels 9 and flanges 27 to be inserted on opposite sides of the rail flanges. The same procedure can be used, if necessary, to install a trolley (described hereinafter) on a center rail in the boxcar.

The outer faces of the bulkhead sections 3 and 5 may be provided by sheets 28 of plywood or other suitable freight contacting material which are attached to internal structural framework. The internal framework may be of various designs to provide sufficient strength at minimum weight. Inasmuch as the lower section 5 gets the most usage and takes the very heavy loads (such as stacks of sheet metal), it is often desirable to construct it somewhat more durably than the upper section 3. Also since it is subject to more abuse, it is desirable to be able to remove it from the section 3 without taking the whole bulkhead 1 out of the car. This is made possible by the hinge connection between sections 3 and 5 which includes outside links 29 that fit on pins 31 which project from the adjacent sides of the bulkhead sections 3 and 5, the hinge being described in more detail hereinafter.

Figure 11:
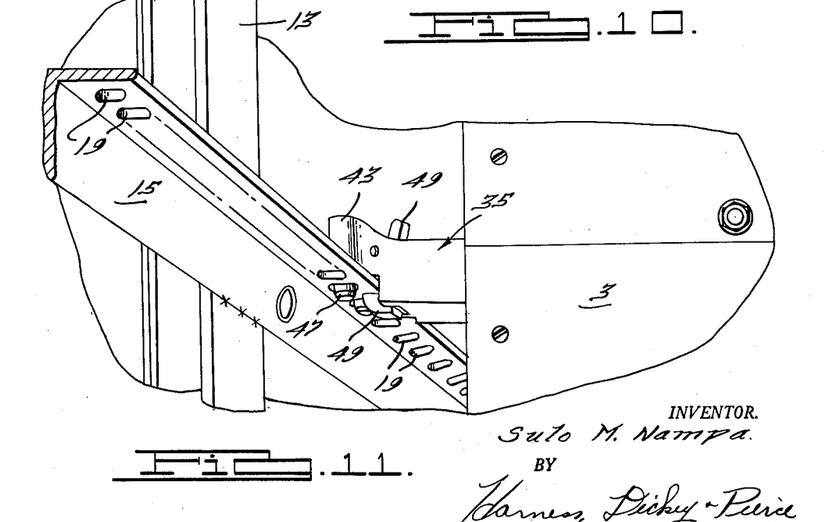
FIG. 11 is a perspective view showing the latch member connected to the support member.

The internal framework of the sections 3 and 5 includes a series of rectangular tubular, guideway forming elements 33 which open out of the vertical side edges of the bulkhead sections on levels corresponding to the various levels of the belt rails 15. Telescopically or slidably housed in the guideways 33 are latch members 35 for attachment to the rails 15, these members being similar in construction to the crossbar end fittings described in U.S. Patent No. 2,725,826 issued to the assignee hereof. The members 35 each have a substantially H-shaped neck 37 which slides freely and loosely in the guideways, being held against removal by crossbolts 39 which engage an end lip 41 on the neck. Like the well known crossbars sold by the assignee hereof under the trademark "DF" and described in the aforementioned patent, the latch member 35 has a head 43 which has a flat bottom face 45 to rest on the top of a rail 15 and two pins 47 to project through perforations 19 in the rail. A latch 49 is pivoted in a through aperture in the head 43 and is spring biased to a position beneath the rail 15 (FIG. 11) where it will prevent the pins 47 from jumping out of the holes 19. A latch finger portion on top of head 43 enables the latch to be manually pivoted for removal. The latch 49 may be of the type shown in my U.S. Patent No. 2,679,214 or in U.S. Patent No. 2,725,826, or of other suitable designs. There is sufficient play of the members 35 in guides 33 to permit vertical motion sufficient for connection and disconnection with respect to rails 15. The width of members 35 is such that they are contained between opposite faces of the bulkhead.

Figure 4:
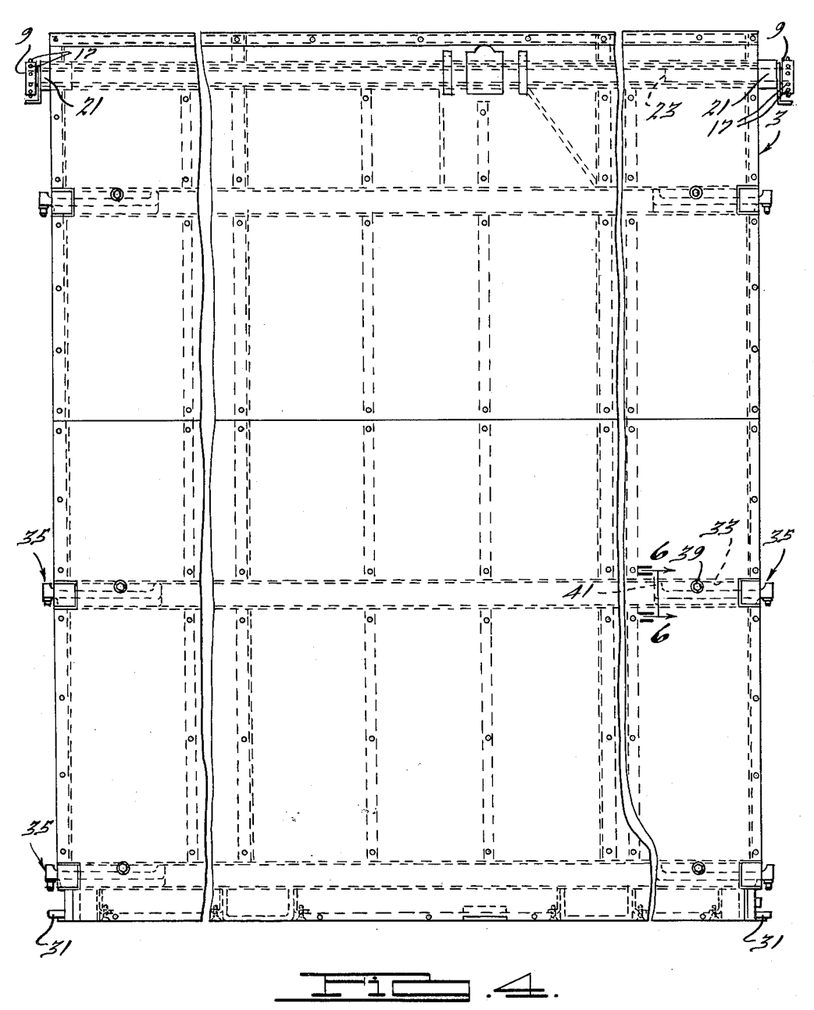
FIG. 4 is a front view, broken away between opposite sides, of the top section of the bulkhead.
Figures 5, 6, 7:
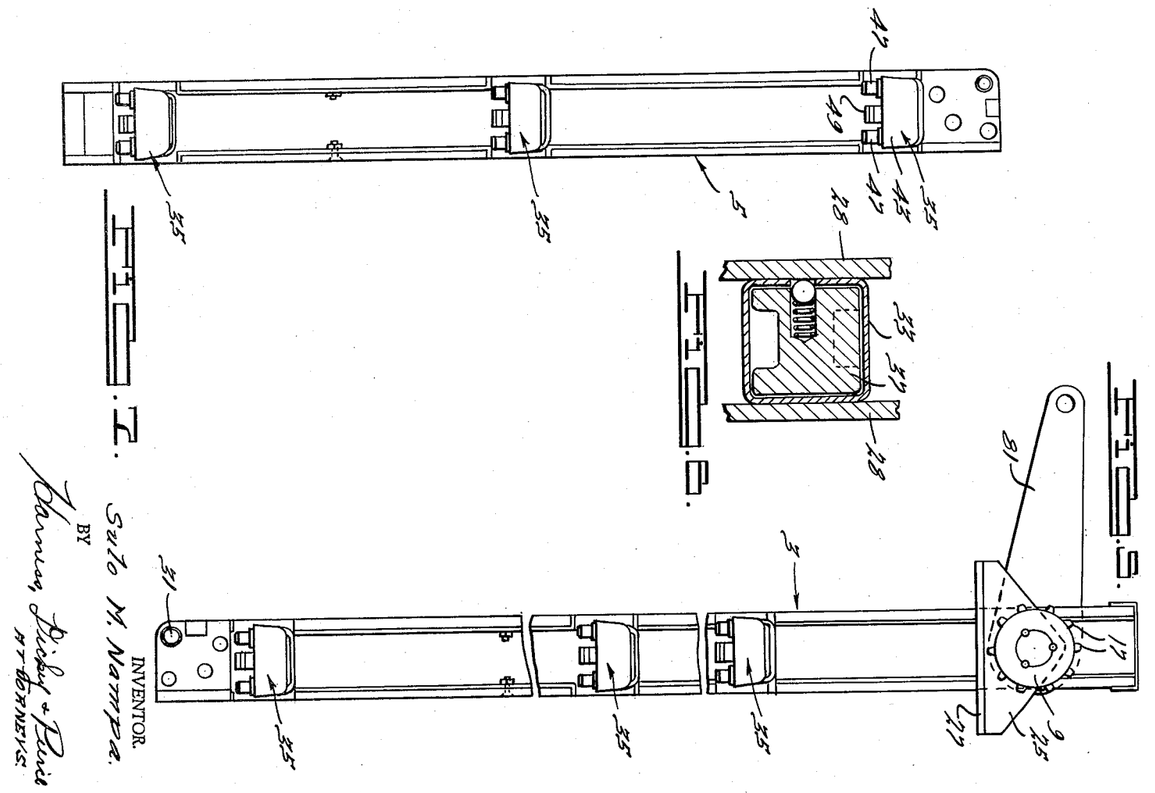
FIG. 5 is an elevation taken from the side of the bulkhead sectoin of FIG. 4.
FIG. 6 is an enlarged cross section taken on line 6—6 of FIG. 4.
FIG. 7 is a side view of the bottom section of the bulkhead.
Figure 9:
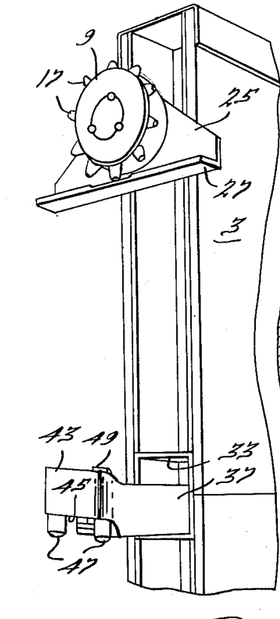
FIG. 9 is a perspective view of a top portion of the bulkhead showing the sprocket support wheel and telescopic latch member.
Figure 10:
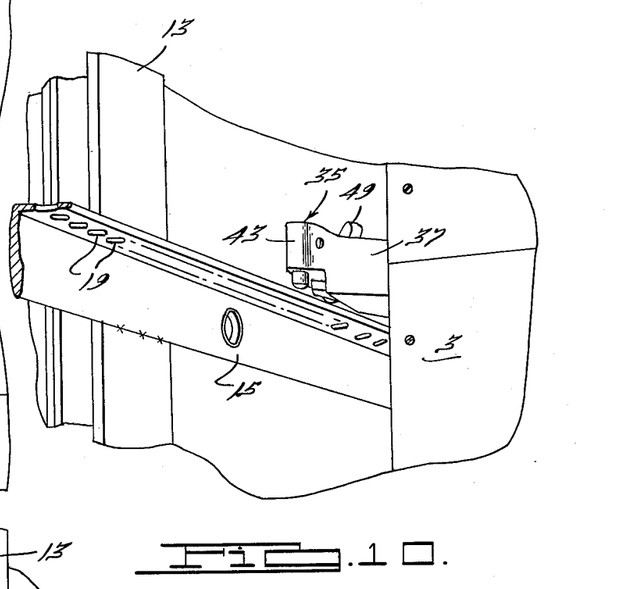
FIG. 10 is a perspective view showing the latch member about to be connected to a support member on the side structure of a boxcar.

It can be readily seen that the several members 35 on opposite sides of the bulkhead sections 3 and 5 will act to hold the bulkhead in vertical position and to transmit longitudinal loads on the bulkhead into the side rails (through pins 47) and thus into the side wall structure of the boxcar 7. Since the members 35 are telescopic relative to the bulkhead, distortions of the side walls of the boxcar or variations in spacing will not affect the bulkhead or ease of connection to the side walls. When it is desired to move the bulkhead to an inoperative position, the latches 49 are operated to release the heads and the members 35 are pushed into openings 33, into which they will substantially completely retract as seen in FIGS. 4 and 8. When in the retracted position, spring pressed ball detents 51 will snap into openings 53 in the guideways 33 to yieldably hold the latch members 35 retracted so that they will not interfere with movement of the bulkhead. Suitable stops (not shown) positively prevent the members from going too far into the tubes 33.

It should be noted that the use of members 35 and rails 15 to support and latch the bulkhead in its vertical, operative position provides an important practical advantage to users of the bulkhead 1. The rails 15 are adapted for use with a number of other bracing components available to the general public and thus, in one car, the user may readily avail himself of a wide variety of stowage and bracing schemes and arrangements.

Figure 3:
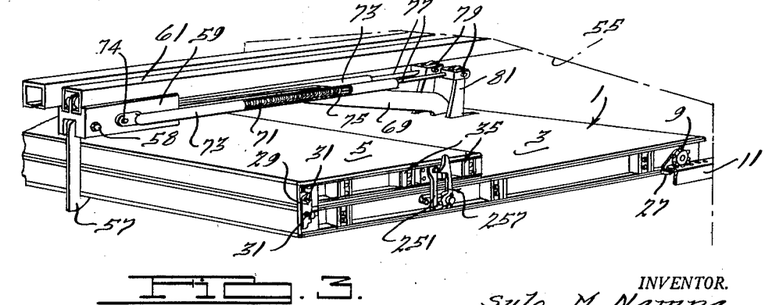
FIG. 3 is a perspective view showing the bulkhead in horizontal stowed or inoperative position at the roof of a boxcar, the latter being shown in dotted lines.
Figure 12:
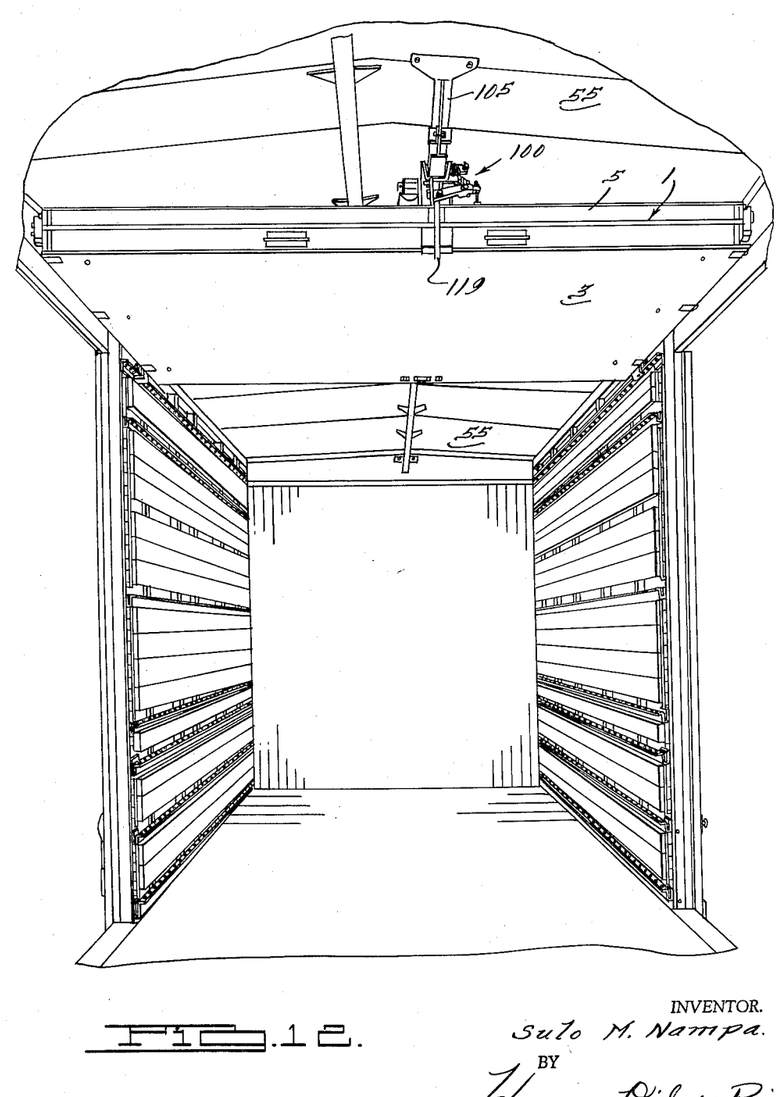
FIG. 12 is a perspective view looking longitudinally of a boxcar and showing a modified construction in which a "dead man's" latch is provided to automatically lock the bulkhead against unrestrained movement lengthwise of the boxcar.

The bulkhead 1 is stowed, when not in use, at the top of the car 7, just under the roof 55, as seen best in FIGS. 3 and 12. In the stowed position the section 5 is folded on top of the section 3, thus reducing by one-third the over-all length of bulkhead and enabling more of them to be used in a car. The bulkhead is held in the horizontal, stowed position by a latch hook 57 which is pivoted at 58 on a trolley or carriage 59. The trolley 59, as seen best in FIGS. 1 and 3, is roughly H-shaped in cross section and embraces the outside faces of rectangular tube track 61 carried by the roof 55 of the car. The tube 61 has a slot along its bottom face and a central, vertical web 63 on trolley 59 projects into the tube through the slot and supports front and rear (not shown) pairs of rollers which ride on the bottom flanges of the tube so that the trolley can roll lengthwise of the car 7. Thus, when the bulkhead 1 is in horizontal position it is rollably supported at one end (the top) by sprocket wheels 9 and at the other (the bottom) by the trolley 59. A suitable lock pin (not shown in this embodiment but disclosed in FIGS. 12–14) may be employed to selectively prevent rolling of the bulkhead 1 on the tracks 11 and 61.

The distance of the trolley 59 from the axle tube 21 is fixed and determined by a radius rod 69. The forward end of the rod 69 is bolted or otherwise securely affixed to the trolley 59 and the rear end extends through an opening in the bulkhead and is pivoted on the tube 21 through a suitable bushing type fitting (not shown). Thus, as the bulkhead 1 moves pivotally between vertical and horizontal positions about the axis of tube 21, the distance of the trolley 59 and hook 57 from the axis remains constant.

The force required to lift the bulkhead 1 from a vertical, operative position to the horizontal, stowed position depends upon the horizontal distance between the center of gravity and the axis of wheels 9. This is the moment arm of the bulkhead and it times the weight of the bulkhead must be overcome by the operator in order to move the bulkhead to the overhead, horizontal position. It is evident that this moment arm increases as the bulkhead moves up toward the horizontal, being a maximum when it is parallel to the track 11 as in FIG. 3. By folding the bulkhead section 5 over on the section 3, this moment arm is reduced since the center of gravity of the bulkhead 1 is moved closer to axis of wheels 9.

In order to automatically assist the operator in raising the bulkhead 1 and to provide a counteracting force resisting downward movement of the bulkhead from the overhead, stowed position, a helper spring system is provided. This system is arranged so that the assisting (or resisting) torque varies with the moment arm of the center of gravity of the bulkhead and is, therefore, approximately a maximum when the bulkhead is in the overhead position and a minimum when the bulkhead is in the vertical position. The force in this spring system is provided by a pair of coil springs 71 which are always held in compressed condition against the ends of spring housings 73 which are pivoted at 74 to trolley 59 on opposite sides thereof. The springs are held compressed in the housings 73 by the heads 75 on rods 77 which slidably extend into the housings through the open ends thereof. The other end of each rod 77 is pivotally connected by a clevis device 79 to the end of an arm 81 which extends through a slot in the bulkhead and is rigidly affixed to tube 21.

It will be seen that the force of springs 71 will act through rods 77 on arms 81 to provide a torque that tends to lift the bulkhead 1. The moment arm on which the spring forces act depends upon the perpendicular distance between their lines of force (i.e., axis of housing 73 and rod 77) and the axis of tube 21 and wheels 9. This moment arm depends upon the direction that arms 81 project from the bulkhead 1 and this direction is preferably made such that the moment arm of the spring force is approximately a maximum when the bulkhead is in the latched up position of FIG. 3. Thus, preferably, in this position the angle defined by pivot points 74 and 79 and the axis of wheels 9 will be substantially ninety degrees. The exact value of this angle depends, in part, upon two other considerations; viz, (1) what angle the bulkhead moves through between its extreme positions, and (2) whether the designer wants the spring force to dead center (i.e., pivots 74 and 79 and axis of tube 21 fall on a straight line) when the bulkhead 1 is vertical. If the bulkhead moves through an angle of more than ninety degrees and dead centers in the vertical position, the maximum moment arm for the spring force will occur after slight movement from the horizontal. In any event, it is apparent that the effect of the springs will increase as the bulkhead moves up and thus they will be of optimum assistance to an operator moving the bulkhead to stowed position. It will be noted that the use of lever arms 81 overcomes an inherent defect in the functioning of springs 71. The springs exert a maximum force when the bulkhead is vertical and a minimum when it is horizontal. This is opposite to what is desired and is overcome by use of the lever arms 81 which result in the effect of the spring force (i.e., moment applied by it) following the desired pattern. It may also be noted that by folding the lower bulkhead section 5 onto section 3 to move in the center of gravity, the helper torque required of springs 71 is reduced, thus enabling smaller springs to be used.

By adjusting the spring rate and the length and angle of arms 81, the manual force that is required of the operator can be controlled and made relatively small so that one man can quickly and safely raise or lower the bulkhead. The helper torque is preferably designed so that at some intermediate angular position of the bulkhead it equals the moment due to bulkhead weight. The intermediate position actually reached by the bulkhead should be low enough so that when the hook 57 is swung away, the bulkhead will drop down to a position where it can be easily reached by an operator standing on the floor of the freight car. Preferably, the spring force goes slightly over center when the bulkhead is vertical, suitable stops being provided on the bottom of the bulkhead, if necessary, to prevent it from moving beyond vertical. It will require very little manual force to move the bulkhead from vertical and once the springs get on the upside of dead center they will take over to move the bulkhead to the neutral position.

Figure 21:
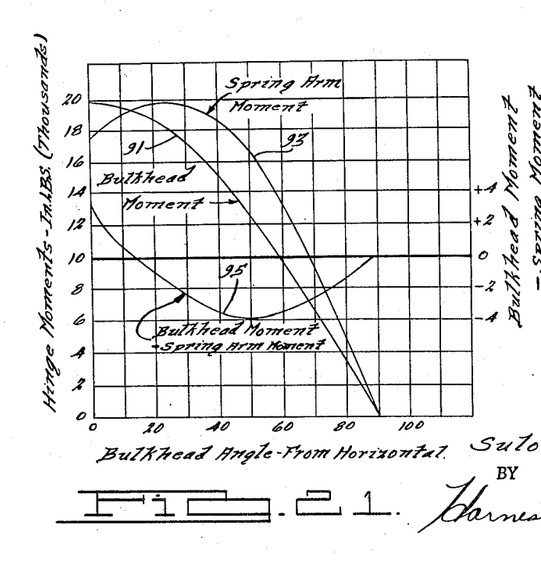
FIG. 21 is a plot of curves showing how the bulkhead moment, the spring arm moment, and difference between these two moments (i.e., moment to be supplied by the operator) varies with angle of the bulkhead.

FIG. 21 shows typical curves of the moments affecting the bulkhead 1 and how they vary with the angle the bulkhead makes with its horizontal, stowed position. Curve 91 is the torque due to weight of the bulkhead. Curve 93 is torque applied by the helper springs working on lever arms 81. Curve 95 is the difference between the two torques and when this is positive represents the theoretical torque that must be applied by the operator to lift the bulkhead to overhead position. These curves do not include the effect of friction, which is significant in the construction shown. This is actually an asset since it will cause the bulkhead to remain in a neutral position considerably lower (e.g., thirty degrees) than the theoretical fifteen degree position (where curves 91 and 93 intersect), momentum of the bulkhead upon release of latch 57 carrying it to such lower position where it can be easily reached by the operator. Because of the momentum effect, it is desirable that the spring moment overcome the bulkhead moment at an intermediate angle, otherwise the bulkhead would be likely to swing all the way into vertical positon as soon as unlatched, even though the moments are rather closely balanced, and the force of the bulkhead might be great enough to be dangerous. It will be noted that the maximum spring moment is below the horizontal position and this, too, is an asset in the construction for which the values of FIG. 21 are plotted since it allows the weight of the bulkhead to move it down a desired amount from the overhead position before the spring forces take over. It will be observed from curve 95 that with the arrangement plotted, the operator theoretically does more work in moving the bulkhead to the vertical than to horizontal position. However, by unfolding the lower section 5 at the neutral position, if he chooses, he can increase the bulkhead moment arm and help overcome the spring moment.

It will be noted in the drawings that there are two roof tracks 61 and that the spring counterbalance and trolley mechanism is off center. This has been done so that the trolley mechanisms (which face the doorways) on adjacent bulkheads for either side of boxcar doorways can run on different tracks, thus permitting them to be brought twice as close together than if both trolley and spring mechanisms ran on the same track. This spacing feature can obviously be used to advantage elsewhere in the car than at the doorways, if desired. Obviously, only one center rail 61 need be used if the spacing feature is not required.

Figure 13:
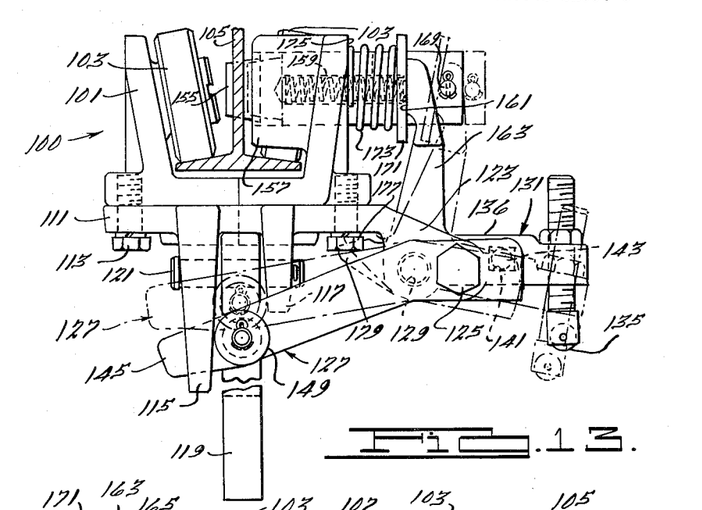
FIG. 13 is a front elevation of the trolley and latch mechanism of FIG. 12.
Figure 14:
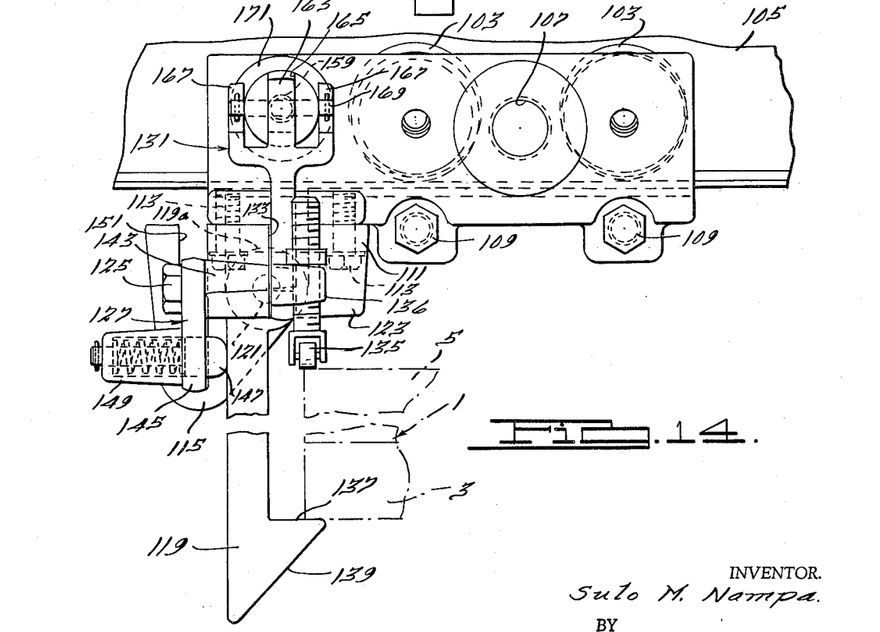
FIG. 14 is a side elevation of the structure in FIG. 13.

FIGS. 12–14 show a modified form of trolley and latch-up mechanism 100 for the bulkhead 1. In this construction, the trolley 101, which is U-shaped, has two pairs of wheels 103 which ride on top of the bottom flange of an I-beam roof rail 105 which corresponds to rail 61. The trolley frame 101 has an opening 107 in each side in which the spring housings 73 (not shown) are pivoted and a pair of bolt clamp sections 109 to which the radius rod 69 (not shown) is rigidly connected.

Attached to the trolley 101 is mechanism to latch the bulkhead in overhead position, to help hold the bulkhead latch in latching position, and to stop the trolley against movement on the rail 105 when the bulkhead is latched up. This mechanism includes a latch plate or body 111 which is attached by bolts 113 to the bottom of trolley frame 101. This includes spaced vertical flanges 115 and 117 between which the hook 119 (like hook 57) is pivoted by pin 121. It also includes a horizontal flange 123 that provides a pivot 125 for hook actuating lever 127 and a pivot 129 for a lockpin lever 131 which fits in slot 133 in the flange 123. The lockpin lever 131 has a bolt 135 threaded on the end of leg 136 thereof and it can be adjusted vertically. The bottom (head) of the bolt 135 will, when the bulkhead is down, hang down as shown in dotted lines in FIG. 13, and be spaced above the latch surface 137 by a distance less than the combined thickness of bulkhead sections 3 and 5. The bottom of adjusting bolt 135 preferably carries a roller pivoted on a horizontal axis extending lengthwise of the car, the roller engaging the surface of the bulkhead and accommodating relative movement. When the bulkhead is raised it will engage slanted surface 139 on the hook and pivot the hook out and then engage the roller bottom of bolt 135 and raise it to the full line position of FIGS. 12–14, thus pivoting the lever 131 in a counterclockwise direction on pivot 129. The lever 131 is on one side of hook 119 and has a slot 141 in it which receives the end of a tapered pin 143 formed to extend transversely to the end of actuating lever 127 which is on the other side of hook 119 (FIG. 14). Thus, when lever 131 moves, lever 127 will move with it about its pivot 125. When the levers are moved counterclockwise due to up movement of bolt 135, the left end 145 of lever 127 will move down and carry with it a spring pressed plunger 147 in protuberance 149, the end 145 being guided during such movement in a slot 151 formed in the flange 115. As the plunger 147 moves down, it will ride down the back edge of hook 119 urging it to latching position under the bulkhead as seen in FIG. 14 (in actual practice, the hook probably being forced more to the right than shown in this figure). It will be seen that the plunger will hold the hook 119 in latching position and prevent it from shaking loose. It can be disengaged by applying a force to the left against surface 139 sufficient to overcome the plunger 147 and let the bulkhead 1 drop down. It will be noted that since the top of hook 119 is circular as seen at 119a the hook can be swung in a counterclockwise direction up to a horizontal position under the trolley 101, thus giving full head room for stowage of cargo.

A "dead man's" latch for locking the trolley 101 in longitudinal position on the rail 105 is put into operation by lever 131 when the bolt 135 is pushed to the up position and made inoperative when the bolt 135 is in the lowered (dotted) position. The latch device for this purpose comprises a plunger type lockpin 155 which slides in a boss 157 formed on trolley 101. A series of holes to receive the pin 155 are formed in the web of the beam 105 so that when the trolley moves so that the pin is aligned with one of them, a spring 159 housed in the pin will force it into the hole to lock the trolley in longitudinal position. The spring 159 seats on the face 161 of leg 163 of lever 131 so that movement of this lever determines whether or not the spring can force the pin into locking position, such position being shown in full lines in FIG. 13. The center of leg 163 fits in a slot 165 in the pin 155 and two other side portions 167 engage the outside thereof and are confined on the pin 155 by a transverse pin 169 which extends through the pin 155 but which is spaced somewhat behind the backs of portions 167 when the pin 155 is operating. A washer 171 slides in pin 155 and confines spring 173 around the pin against face 175 of the trolley 101. When the bulkhead is lowered, the leg 163 will be forced counterclockwise by spring 173 (and spring 159) until portions 167 abut pin 169 whereupon spring 173 will continue to move the lever 131 and withdraw pin 155 from the beam 105. Such movement is stopped by surface 177 on a leg 179 of lever 131 which will engage the bottom of plate 111.

The hinge connection between the upper and lower bulkhead sections 3 and 5 is shown in somewhat more detail in FIGS. 15-20 taken in conjunction with FIGS. 4, 5, 7 and 8. This hinge is constructed to avoid protruding parts, permit ready disconnection, and prevent relative shifting between the bulkhead sections. There is a hinge on each side edge of the bulkhead and these are the same so only one need be described. The hinge is provided by pad 201 on the upper section and pad 203 on the lower section, each of which is secured to the bulkhead by three bolts 205. The pads 201 and 203 (and the aligned corners of the bulkhead sections) have adjacent rounded corners 207 and in these corners are the pins 31 on which the link 29 is mounted, the link having a thickness substantially equal to the projecting lengths of the pins 31. The pins and the holes in the link have a close fit so the link does not tend to fall off even though it can be easily removed. The link 29 has rounded shoulders 209 which blend the body section 211 into narrower end sections 213. The pad 201 has a square stop projection 215 while pad 203 has a square stop projection 217.

Figures 15, 16:
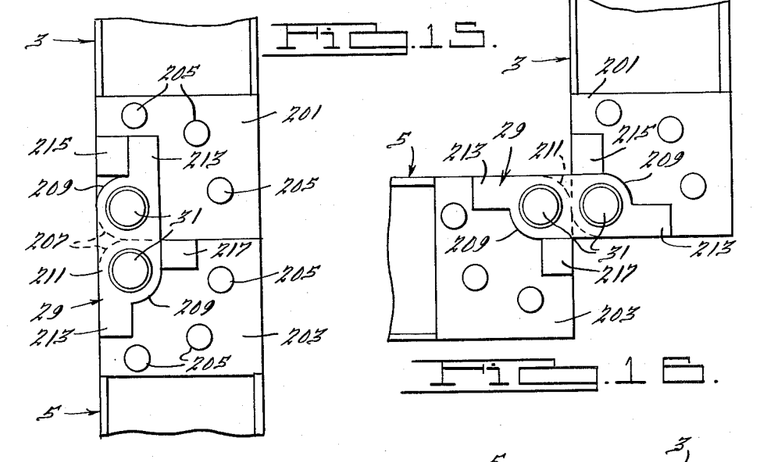
FIG. 15 is a side elevation, broken away, showing the hinge between the upper and lower bulkhead sections when the sections are unfolded.
FIG. 16 is a side elevation showing the hinge construction in half folded position.

It can be seen from FIG. 15 that all parts are within the confines of the pads 201 and 203 when the bulkhead is vertical and that engagement of the link 29 with stops 215 and 217 will act with pins 31 to prevent transverse shifting of the sections relative to each other. When the lower section is folded up, the first ninety degrees of movement (FIG. 16) will be pivoting of the link 29 about pin 31 on pad 201 at which point the body 211 will engage stop 215 to prevent further pivoting about this pin. The rounded corners 207 and 209 permit this movement, as do the round corners 209 on the link. The next ninety degrees will be pivoting of pad 203 and its pin 31 in the hole therefor in link 29, the link being held stationary by stop 215. When stop 217 strikes projection 213, folding will be completed and the stops and pins will act to prevent relative shifting of the sections along the engaging faces of the sections.

Figures 17, 18:
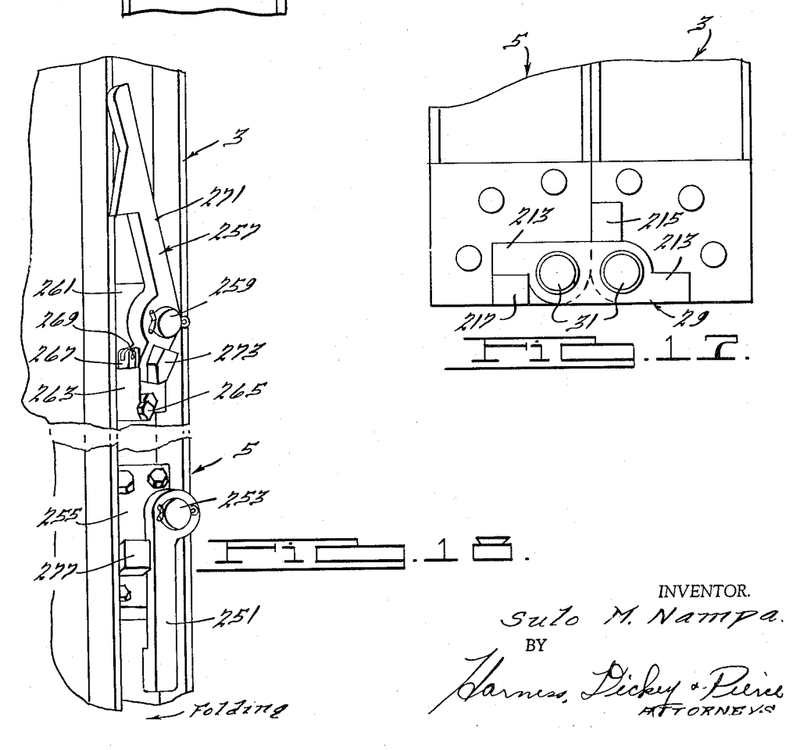
FIG. 17 is a side elevation showing the hinge construction in fully folded position.
FIG. 18 is a perspective side view showing the folding latch in vertical position.
Figure 19:
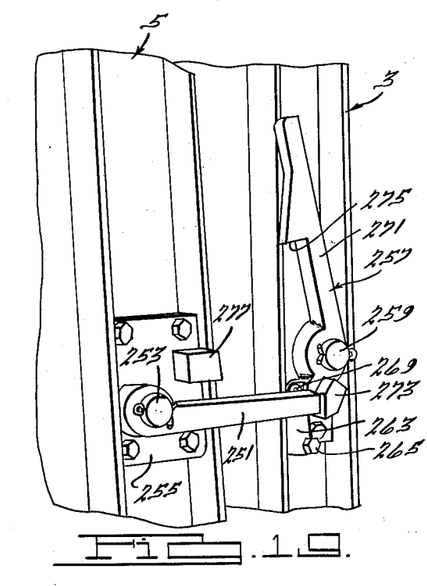
FIG. 19 is a perspective side view showing the folding latch in a position just prior to latching.
Figure 20:
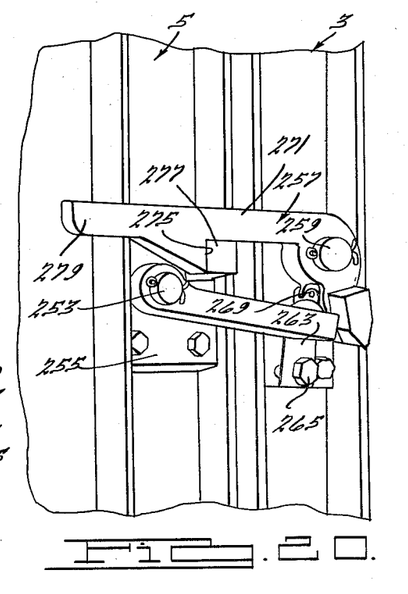
FIG. 20 is a perspective side view showing the folding latch in operative latched position.

FIGS. 18-20 show a latch construction which operates automatically to hold the sections 3 and 5 in folded position. This includes a tripper member 251 which is pivoted at 253 to a pad 255 that is bolted to a side of the lower section 5. In vertical position of the bulkhead, the tripper 251 hangs down within the opposite faces of the bulkhead as can be seen in FIG. 18, and suitable stop means (not shown) prevents it from swinging to the right when the bulkhead is folded in the direction of the arrow. A latch member 257 is pivoted at 259 on a pad 261 that is bolted to the side of the upper section 3. The member 257 is held between the opposite faces of the bulkhead by an over center spring plunger device which includes a housing 263 pivoted at 265 to the pad 261. A coil spring (not shown) in the housing urges plunger 267 outwardly. The plunger 267 is pivoted at 269 to an ear on the hub of member 257 and thus can force latch arm 271 to a substantially upright position as seen in FIGS. 18 and 19. When the lower section 5 is folded up toward the upper section 3, the tripper 251 will swing by gravity around its pivot 253 to the position of FIGS. 19 and 20 where it projects at substantially a right angle to the face of the bulkhead, being held against downward swinging by a stop (not shown). As the section 5 moves close to section 3, the nose of tripper 251 will abut a lug 273 on the hub of latch 257 and force the latch to move about its pivot 259 until the spring pivot 269 passes over center (i.e., from the left to the right side of a line between pivots 265 and 259 in FIG. 19) whereupon the spring plunger and gravity will force the latch arm 271 to swing down until hook surface 275 latches behind stop piece 277 which projects from pad 255 (and which tripper 251 passes over), thus latching the two bulkhead sections together in folded position. The latch 257 has a finger piece 279 projecting beyond the face of bulkhead section 3 (FIG. 20) which can be grasped and lifted to disconnect the two bulkhead sections so that they can be unfolded. The latch 257 should be lifted far enough to permit the spring device to go over center so that it can hold it in the position of FIGS. 18-19.

What is claimed is:

1. In a railroad freight car having a pair of spaced side walls, a plurality of belt rails mounted on and spaced vertically of each of said side walls, a bulkhead extending transversely of said car and including an upper section, a lower section, and means connecting said lower section to said upper section for pivotal movement about an axis perpendicular to said side walls between a first position in the plane of said upper section and a second position parallel to and overlying a portion of said upper section, wheel means mounted on said bulkhead on an axis adjacent the upper edge thereof and extending at right angles to said side walls, said wheel means engaging an upper one of said belt rails at each of said side walls and supporting said bulkhead thereon for rolling movement therealong and for pivotal movement about said last named axis between a vertical operative position and a substantially horizontal stowed position, a trolley track mounted on said car between said side walls and above said bulkhead, a trolley mounted on said trolley track for movement therealong, a fixed length rod connected to said trolley and pivotally connected to said bulkhead to permit said bulkhead to pivot relative thereto about said last named axis, and force applying means connected to said trolley and to said bulkhead and effective during movement of said bulkhead between said positions to produce a moment urging said bulkhead toward said stowed position.

2. The combination defined in claim 1 including latch means on said bulkhead operable upon movement of said lower section to said second position to latch said lower section in said second position.

3. The combination defined in claim 1 including latch means on said trolley engageable with said bulkhead to latch said bulkhead in said stowed position.

4. The combination defined in claim 1 including a combination latch mechanism on said trolley including a first latch element engageable with said bulkhead to latch said bulkhead in said stowed position, a second latch element engageable with said trolley track to lock said trolley against movement longitudinally of said track, and a third latch element connected to said first and second latch elements and disposed to be engaged by said bulkhead upon movement to said stowed position and effective upon such engagement to actuate both said first latch element and said second latch element.

5. The combination defined in claim 1 including co-operating engaging means on said wheel means and on said upper of said belt rails preventing movement of said wheel means relative to said upper of said belt rails along said first named axis.

6. The combination of claim 5 including means on said bulkhead engageable with said upper of said belt rails for preventing movement of said wheel means transversely of said upper of said belt rails to disengage said co-operating engaging means.

7. The combination defined in claim 1 including a second bulkhead spaced longitudinally of said car relative to said first bulkhead and similarly supported upon said upper ones of said belt rails, a second trolley track parallel to and spaced laterally of said car relative to said first named track, a second trolley mounted on said second track and having a second fixed length rod and second force applying means similarly connected to said second trolley and to said second bulkhead and wherein said trolley tracks overlap longitudinally of said car and said trolleys are disposed between said bulkheads when they are in their vertical positions so that said trolleys, rods and force applying means may be moved alongside one another when the bulkheads approach one another and so that they are clear of the space beyond the remote side of each bulkhead.

8. In freight storage apparatus including a bulkhead, means for supporting the bulkhead for movement between a vertical operative position and an overhead stowed position and including latch means for holding the bulkhead in the overhead position and including a latch plate, a movable latch element mounted on said latch plate for engaging the bulkhead in the overhead position, and yieldable means on the latch plate operated only upon movement of the bulkhead to stowed position and including lever means engaging said latch element for substantially increasing the moment for urging the latch element into operative position and for yieldably holding it in operative position.

9. The invention set forth in claim 1 including means mounting said latch element on said latch plate and connecting said yieldable means to said latch element so that said latch element can be swung to an out-of-the-way position when said bulkhead is in operative position.

10. In freight storage apparatus for railroad freight cars or the like, a bulkhead panel, means adjacent the top of the panel for supporting it for movement lengthwise of the freight car and from a vertical operative position to a horizontal stowed position adjacent the roof of the freight car, a combination latch device comprising a first latch element engageable with the bulkhead to latch it in stowed position and including means engaging said first latch element and operated by movement of the bulkhead to stowed position for urging said first latch element into latched engagement with the bulkhead, said device also including a second latch element connected to said last named means and operative to prevent longitudinal movement of the bulkhead in said freight car when in said stowed position and operated by said last mentioned means.

11. In a folding bulkhead for railroad cars and the like, an upper bulkhead section and a lower bulkhead section, each having side edges, means hinging the sections together so that the lower section can be folded about a horizontal axis from a position in which it forms a coplanar extension of the upper section to a position in which it lies against a face of the upper section, one of said sections having a tripper lever pivotally mounted on it and disposed so that it hangs vertically under the force of gravity and lies between opposite faces of said section, the other of said sections having a latch element pivotally connected to its side edge, a spring plunger device pivotally connected to the side edge of said other section and to said latch element and arranged so that the line of force thereof passes over-center as the latch member pivots between a latching position and an inoperative position, said latch element being mounted so that in its inoperative position it is forced by said spring to extend in a direction between the opposite faces of said bulkhead section and in its latching position it is yieldably held disposed to extend substantially at right angles to said faces, and a projection on said one section engageable by said latch element when the latter is in said latching position to latch the two sections together, said tripper lever engaging said latch element upon movement of said lower bulkhead section to said second named position to move said latch element to said latching position.

References Cited in the file of this patent
UNITED STATES PATENTS

| | | |
|---|---|---|
| 788,761 | Erwood | May 2, 1905 |
| 1,388,819 | Moriarty | Aug. 23, 1921 |
| 2,063,434 | Hersey et al. | Dec. 8, 1936 |
| 2,071,802 | Sweeley et al. | Feb. 23, 1937 |
| 2,227,807 | Dixon | Jan. 7, 1941 |
| 2,605,064 | Davis | July 29, 1952 |
| 2,681,699 | Lissaman | June 22, 1954 |
| 2,719,322 | Hager et al. | Oct. 4, 1955 |
| 2,752,864 | McDougal et al. | July 3, 1956 |
| 2,772,641 | Roberts et al. | Dec. 4, 1956 |
| 2,786,229 | Carroll | Mar. 26, 1957 |
| 2,866,419 | Candlin | Dec. 30, 1958 |

UNITED STATES PATENT OFFICE
CERTIFICATE OF CORRECTION

Patent No. 3,017,842 January 23, 1962

Sulo Michael Nampa

It is hereby certified that error appears in the above numbered patent requiring correction and that the said Letters Patent should read as corrected below.

Column 9, line 53, for the claim reference numeral "1" read -- 8 --.

Signed and sealed this 26th day of June 1962.

(SEAL)
Attest:

ERNEST W. SWIDER
Attesting Officer

DAVID L. LADD
Commissioner of Patents